OR 3,720,453

United States [redacted] [redacted] [redacted]

Lee et al.

[11] 3,720,453

[45] March 13, 1973

[54] DIFFERENTIAL READOUT HOLOGRAPHIC MEMORY

[75] Inventors: Tzuo-Chang Lee, Bloomington; James David Zook, Burnsville, both of Minn.

[73] Assignee: Honeywell, Inc., Minneapolis, Minn.

[22] Filed: Sept. 20, 1971

[21] Appl. No.: 181,846

[52] U.S. Cl. ....................350/3.5, 250/219, 340/173, 350/157

[51] Int. Cl. ....................................G02b 27/22, G11b

[58] Field of Search .......350/3.5, 150, 157; 250/219; 340/173

[56] References Cited

UNITED STATES PATENTS

| | | | |
|---|---|---|---|
| 3,628,847 | 12/1971 | Bostwick | 350/3.5 |
| 3,561,838 | 2/1971 | Gabor | 350/3.5 |
| 3,401,590 | 9/1968 | Massey | 350/157 |
| 3,549,236 | 9/1968 | Mink | 350/157 |
| 3,609,001 | 9/1971 | Weber | 350/157 |

*Primary Examiner*—David Schonberg
*Assistant Examiner*—Robert L. Sherman
*Attorney*—Lamont B. Koontz et al.

[57] ABSTRACT

A holographic optical memory utilizes a differential technique to significantly increase the signal-to-noise ratio during the readout stage of operation.

18 Claims, 8 Drawing Figures

INVENTOR.
TZUO-CHANG LEE
JAMES DAVID ZOOK
BY
Osmund R. Dahl
ATTORNEY.

*INVENTOR.*
TZUO-CHANG LEE
JAMES DAVID ZOOK
*BY* Osmund R. Dahl
*ATTORNEY.*

INVENTOR.
TZUO-CHANG LEE
JAMES DAVID ZOOK
BY Osmund R. Dahle
ATTORNEY

INVENTOR.
TZUO-CHANG LEE
JAMES DAVID ZOOK
BY Omund R. Dahle
ATTORNEY.

DIFFERENTIAL READOUT HOLOGRAPHIC MEMORY

REFERENCES TO RELATED PATENT APPLICATIONS

Reference should be made to a co-pending patent application entitled "Heterodyne Readout Holographic Memory" Ser. No. 181,803 by Tzuo-Chang Lee which was filed on an even date herewith and which is assigned to the same assignee as the present invention.

BACKGROUND OF THE INVENTION

This invention relates to an optical memory and in particular to a holographic optical memory.

In the specification, the term "light" is used to mean electromagnetic waves within the band frequencies including infrared, visible and ultraviolet light.

A holographic optical memory makes use of a memory medium upon which many individual holograms are stored. Each hologram represents a different bit pattern or "page." The information is stored by directing two beams to a desired location on the memory medium. One beam, the information beam, contains the bit pattern formed by a page composer, while the second beam acts as the reference beam necessary for holographic storage. To read out the information, a readout beam selectively illuminates one of the holograms stored, thereby producing at a reconstructed image plane a reconstructed image of the bit pattern stored in the hologram. An array of photodetectors is located at the reconstructed image plane to detect the individual bits of the bit pattern.

This type of memory is extremely attractive. In the "bit-by-bit" type of optical memory, a single recorded spot on the memory medium represents only one information bit. On the other hand, a single hologram recorded on the same memory medium represents a page which may contain as many as $10^5$ bits. Memories having $10^5$ or $10^6$ pages have been proposed, with each page containing about $10^5$ bits.

Another advantage of the holographic optical memory is that the information stored in the hologram is stored uniformly throughout the hologram rather than in discrete areas. Therefore the hologram is relatively insensitive to blemishes or dust on the memory medium. A small blemish or dust particle on the memory medium cannot obscure a bit of digital data as it can if the bits are stored in a bit-by-bit memory.

One difficulty experienced with certain materials used for memory media in holographic optical memories, such as MnBi and certain photochromic materials, is that these materials exhibit a low diffraction efficiency. Therefore, the signal received by the photodetector array is rather low. As a result the signal-to-noise ratio during the readout stage is also low. Although the intensity of the light received by the photodetector array can be increased to some extent by increasing the power of the read-out beam, the readout beam power must not be so great that the information is erased or the film destroyed.

SUMMARY OF THE INVENTION

The holographic optical memory of the present invention utilizes a differential technique during readout which greatly improves the signal-to-noise ratio. A plurality of holograms each containing a particular bit pattern are stored upon the memory medium of the holographic memory. To achieve readout of a particular pattern, light source means provides a coherent light beam which is split by beam splitter means into a first and a second beam. Light beam directing means direct the first beam to one of the holograms. A portion of the first beam is diffracted by the hologram to form, at first and second reconstructed image planes, a reconstructed image of the bit pattern stored in the hologram. Light beam superimposing means superimpose the second beam with the diffracted portion of the first beam. The wavefronts of the superimposed portions of the first beam and the second beam are well matched to make the differential technique effective. Polarization rotating means positioned in the path of either the first or the second beam rotates the polarization of that beam such that the diffracted portion of the first beam has a first polarization direction, and the second beam has a second polarization direction which is essentially orthogonal to the first polarization direction. Polarizing beam splitter means is positioned in the path of the superimposed beams for directing that portion of the superimposed beams having a third polarization direction to the first reconstructed image plane and for directing that portion of the superimposed beams having a fourth polarization direction to the second reconstructed image plane. The third polarization direction is oriented essentially 45° from both the first and second polarization directions, and the fourth polarization direction is oriented essentially orthogonal to the third polarization direction. A first array of detectors is positioned at the first reconstructed image plane, each detector of the array being positioned to receive light representing one bit of the bit pattern and to provide a first signal indicative of the intensity of the light received. Similarly, a second array of detectors is positioned at the second reconstructed image plane, each detector of the second array being positioned to receive light representing one bit of the bit pattern and provide a signal indicative of the intensity of the light received. Signal comparing means receives each of the first and second signals and produces an output signal for each of the bit patterns. The output signal is indicative of the difference of corresponding first and second signals from the first and second arrays.

DESCRIPTION OF THE PREFERRED EMBODIMENTS

Figure 1:
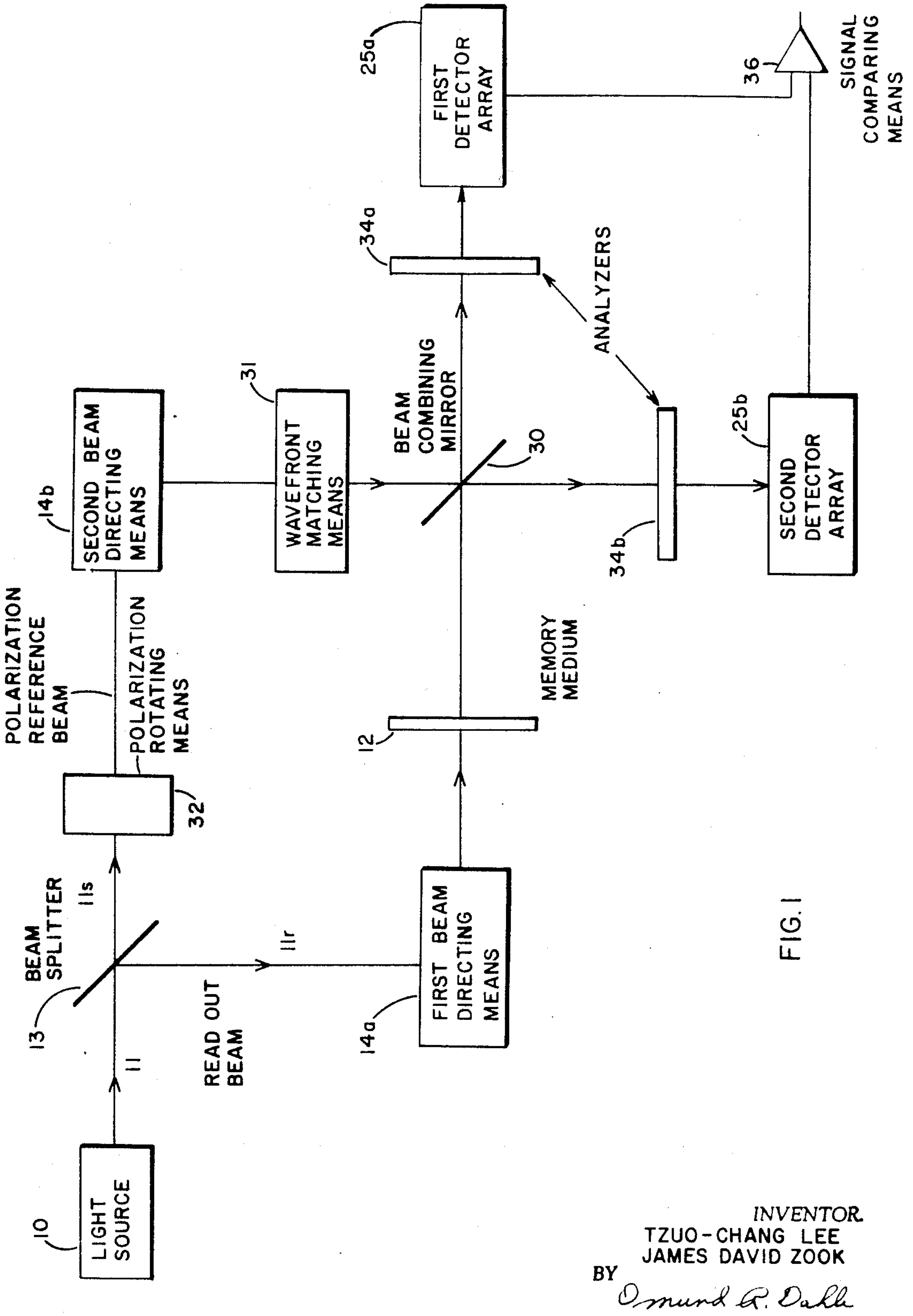
FIG. 1 diagrammatically shows one embodiment of the present invention.

FIG. 1 shows a readout system for a holographic memory utilizing the differential technique of the present invention. Light source means 10 provides a coherent light beam 11. A plurality of holograms are stored in memory medium 12. Beam splitter 13 splits light beam 11 into a first and second beam. These beams are referred to as readout beam **11*r* and polarization reference beam 11*s*. First beam directing means 14*a* directs readout beam 11*r* to one of the holograms stored in the memory medium 12. Readout beam 11*r* impinges upon one of the holograms stored in memory medium 12 and a portion of readout beam 11*r* is diffracted by the hologram to form, at first and second reconstructed image planes, a reconstructed image of the bit pattern stored in the hologram. Light beam superimposing means, which comprises second light beam directing means 14*b*, wavefront matching means 31, and beam combining mirror 30, superimpose polarization reference beam 11*s* with the diffracted portion of readout beam 11*r*. Alternatively, first and second beam directing means 14*a* and 14*b* may be replaced by a single beam directing means positioned between light source means 10 and beam splitter 13. In such an embodiment, beam inverting means must be provided in the path of either readout beam 11*r* or polarization reference beam 11*s*. Polarization rotating means 32 is positioned in the path of polarization reference beam 11*s*. Polarization rotating means 32 rotates the polarization of polarization reference beam 11*s* such that the diffracted portion of readout beam 11*r* has a first polarization direction, and polarization reference beam 11s has a second polarization direction essentially orthogonal to the first polarization direction. Although polarization rotating means 32 is shown as being positioned in the path of polarization reference beam 11*s*, it is to be understood that it can be positioned in the path of readout beam 11*r* instead. Also, a separate polarization rotating means may not be needed at all if the memory medium provides the feature of rotating the polarization of the diffracted portion of readout beam 11*r***.

Polarizing beam splitter means, which comprises beam combining mirror 30 and first and second analyzers **34*a* and 34*b***, directs that portion of the superimposed beams having a third polarization direction to the first reconstructed image plane. Similarly, that portion of the superimposed beams having a fourth polarization direction is directed to the second reconstructed image plane. The third polarization direction is oriented essentially 45° from both the first and second polarization directions, and the fourth polarization direction is oriented essentially orthogonal to the third polarization direction. Alternatively, the polarizing beam splitter means may comprise a single polarization beam splitter such as a Nichol, Glan-Thompson or Wallaston prism.

First and second detector arrays **25*a* and 25*b* are positioned at the first and second reconstructed image planes respectively. Each detector of the first array is positioned to receive light representing one bit of the bit pattern and to provide a first signal indicative of the intensity of the light received. Similarly, each detector of the second array is positioned to receive light representing one bit of the bit pattern and to provide a second signal indicative of the intensity of the light received. Signal comparing means 36 receives each of the first and second signals and produces an output signal for each of the bits of the bit pattern. The output signal is indicative of the difference of corresponding first and second signals from first and second detector arrays 25*a* and 25*b*. For simplicity, a single electrical connection from each of the detector arrays is shown. It is to be understood, however, that electrical connection to the signal comparing means is made for each detector of first detector array 25*a* and for each detector of second detector array 25*b***.

Figure 2A:
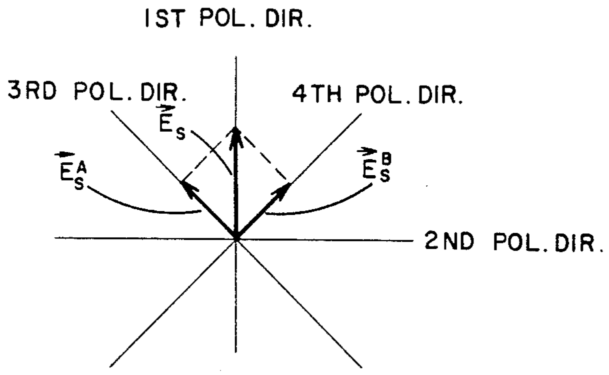
FIGS. 2*a*, 2*b* and 2*c* are vector diagrams illustrating the operation of the differential readout technique of the present invention.

FIG. 2 illustrates the operation of the differ-ential detection method of the present invention by the use of three vector diagrams. FIG. 2*a* shows the electric field vector $\vec{E}_S$ which represents the diffracted portion of readout beam **11*r***. As described above, $\vec{E}_S$ is oriented in the first polarization direction. Also shown in FIG. 2*a* are the components of electric field vector $E_S$ in the third and fourth polarization directions. These components are designated as $\vec{E}_S^A$ and $\vec{E}_S^B$, respectively.

Figure 2B:
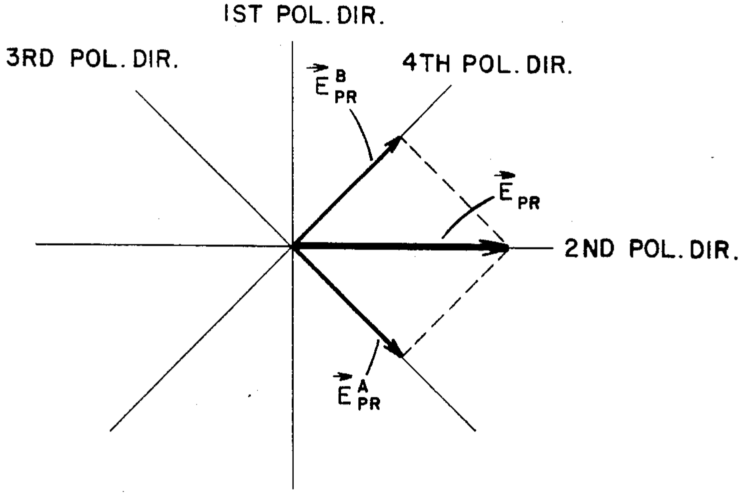

FIG. 2*b* illustrates the electrical field vector $\vec{E}_{pr}$ which represents polarization reference beam **11*s***. As shown in FIG. 2*b*, $\vec{E}_{PR}$ is oriented in the second polarization direction, which is orthogonal to the first polarization direction. Electric field vectors $\vec{E}_{PR}^A$ and $\vec{E}_{PR}^B$ designate the components of $\vec{E}_{PR}$ in the third and fourth polarization directions respectively.

Figure 2C:
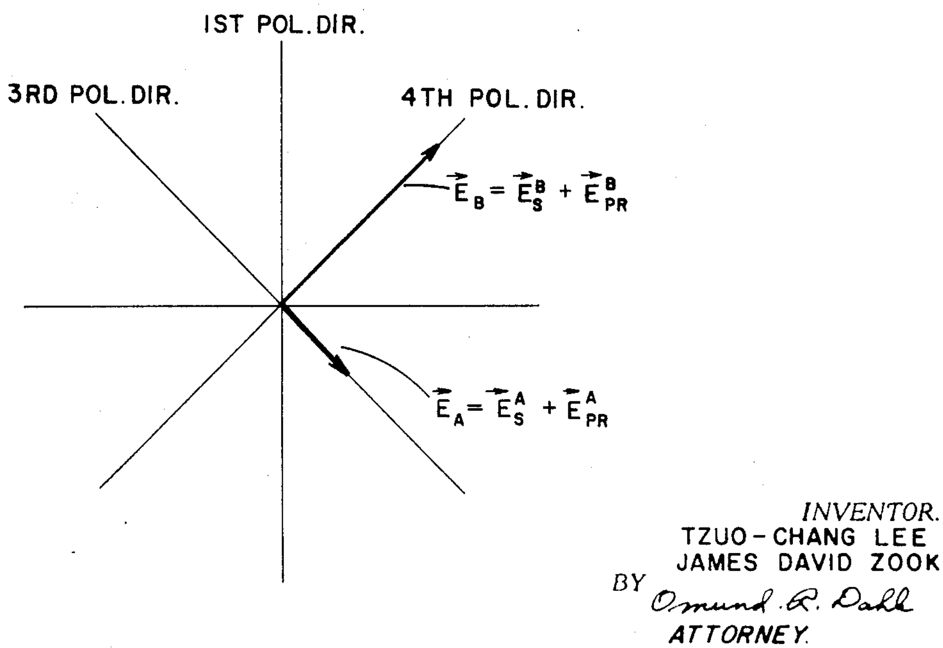

FIG. 2*c* illustrates the total electric field vectors $\vec{E}_A$ and $\vec{E}_B$ having the third and fourth polarization directions respectively. $\vec{E}_A$ and $\vec{E}_B$ represent those portions of the superimposed beams which are directed to the first and second detector arrays **25*a* and 25*b***.

It can be seen that when $\vec{E}_S$ is non-zero, $\vec{E}_A$ and $\vec{E}_B$ will differ in magnitude. Therefore, the signals produced by corresponding detectors of the first and second detector arrays will differ in magnitude. Signal comparing means 36 will therefore produce a non-zero output signal.

It has been found that the particular embodiment of the present invention shown in FIG. 1 is quite difficult to implement in practice. This is due to the critical dependence on alignment of the polarization reference beam **11*s* and the diffracted portion of readout beam 11*r***. Not only must the two beams be parallel, but also the wavefronts must be well matched because small phase differences in the two beams with respect to each other will degrade the performance. For this reason, the preferred embodiment of the present invention further includes pivoting means positioned proximate the memory medium. The use of pivoting means in a holographic optical memory is described in a co-pending patent application Ser. No. 148,505, filed June 1, 1971 by T. C. Lee entitled "Holographic Optical Memory," which is assigned to the same assignee as the present invention. This system is particularly useful in differential detection because it allows the holograms to be read using the same beams which acted as the reference beam and the signal beam during the write-in of the holograms as the readout beam and the polarization reference beam, respectively, during readout. The pivoting means not only pivots the portion of the readout beam which is diffracted by each hologram into the first and second reconstructed image planes, but also pivots the polarization reference beam into a reconstructed image plane. In so doing, wavefront matching is automatically achieved, making a separate wavefront matching means unnecessary.

Referring to FIG. 3, there is shown a holographic optical memory representing one preferred embodiment of the present invention. Elements similar to those described in FIG. 1 are denoted by identical numerals. Light source means 10 provides a coherent light beam 11. Memory medium 12 is provided for the storage of a plurality of holograms. In the particular embodiment shown in FIG. 3 the memory medium is a magnetic film of manganese bismuth. However, it is to be understood, that other materials may be used as memory medium 12. These include photochromic, photoplastic and various photographic materials. It should be noted that when a magnetic film such as manganese bismuth is utilized as the memory medium and the magneto-optic Faraday or Kerr effect is utilized for reconstruction of the stored hologram, the diffracted portion of the readout beam has its polarization direction rotated by 90° by the magnetic film. Therefore, when a magnetic film is utilized as the memory medium, a separate polarization rotating means 32 as shown in FIG. 1 is unnecessary.

Beam splitter means 13 is positioned in the path of light beam 11 to split coherent light beam 11 into a first beam **11*r* and a second beam 11*s*. Beam directing means simultaneously direct first beam 11*r* and second beam 11*s* to coincide at a selected region of memory medium 12. In the particular embodiment shown in FIG. 3, beam directing means comprise light beam deflector means 14, an array of individual lenses 15, field lens 16, mirror 17, and beam inverting means 18. In one embodiment beam splitter 13, array 15 field lens 16** comprise a single hololens, as described by W. C. Stewart and L. S. Cosentino in "Optics for a Read-Write Holographic Memory," *Applied Optics*, 9, 2271, October 1970. Light beam deflector means 14 is positioned between light source means 10 and beam splitter means 13 for deflecting first and second beams **11*r* and 11*s* to a plurality of resolvable spots. Light beam deflector means 14 may, for example, comprise acousto-optic, electro-optic or mechanical light beam deflectors. In its preferred form light beam deflector means 14** is capable of deflecting the first and second beams in two dimensions, hereafter referred to as the *x* and the *y* directions. In the various figures, two possible beam positions are shown which are represented by the solid and dashed lines, respectively.

Mirror 17 may be positioned in either first beam **11*r* or second beam 11*s*. Mirror 17 changes the direction of propagation of one of the beams so that they may converge on a common area of memory medium 12**.

The array of individual lenses 15 is positioned in the path of second beam 11s. The array may comprise a hololens or, as shown in FIG. 3, may consist of a panel of fly's eye lenses. Each lens is positioned at one of the plurality of resolvable spots. Preferrably the size of each lens is equal to that of one resolvable spot. The function of the individual lenses is to reduce the beam diameter of the resolved spot such that the ratio of the original spot size to the reduced spot size is equal to or greater than the number of resolution elements needed to form one hologram. A Fourier transform hologram should have a minimum linear size of $3\lambda L,/d$ where $d$ is the bit-to-bit spacing, $\lambda$ is the wavelength of the light and L is the distance between the object and the hologram. The resolution in the hologram is $\lambda L/D$ so that the hologram needs a minimum of $9N^2$ resolution spots, where D is the linear dimension of the object and N is the total number of bits in one dimension. If the diameter of the individual lens in the fly's eye lens panel is A and the focal length f, then the condition $(A^2/\lambda f)^2 \geq 9N^2$ must be satisfied. A similar system for increasing the number of resolvable spots by the use of fly's eye lenses is described in U.S. Pat. No. 3,624,817 by T. C. Lee and J. D. Zook, which is assigned to the same assignee as the present invention.

Field lens 16 pivots the deflected beam at pivot plane A. In the preferred embodiment shown in FIG. 3*a*, field lens 16 is in physical contact with the array of individual lenses 15. However, it is to be understood that field lens 16 may be separate from the array of individual lenses 15.

Figures 3A, 3B:
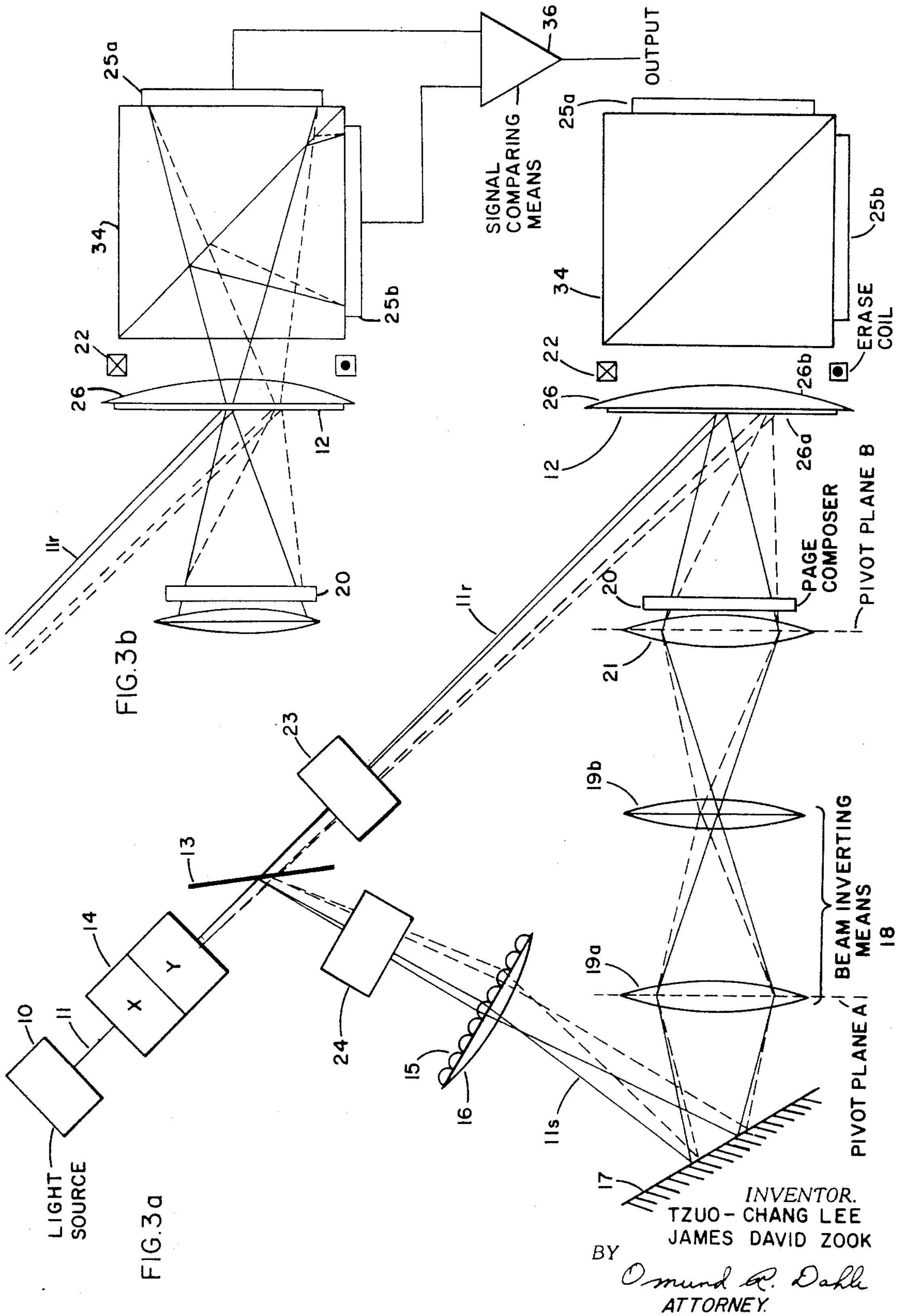
FIGS. 3*a* and 3*b* show a preferred embodiment of the present invention in which pivoting means are utilized to pivot and superimpose the readout and the polarization reference beams.

Beam inverting means 18, which comprise lenses **19*a* and 19*b* positioned in the path of second beam 11s, inverts the angular direction $+\phi$ into $-\phi$, where $\phi$ is the angle which the central ray of second beam 11s makes with respect to the optical axis of the lens system. Beam inverting means 18 is necessary to ensure that the deflected first and second beams 11*r* and 11*s* always coincide at the memory medium. Beam inverting means 18 alternatively may be positioned in the path of reference beam 11*r*, and may comprise a pair of dove prisms rather than lenses 19*a* and 19*b***. As shown in FIG. 3*a*, beam inverting means 18 is so positioned that second beam 11s is again pivoted at pivot plane B.

Page composer 20 is positioned in the path of second beam **11*s* proximate pivot plane B. Page composer 20 consists of a plurality of light valves which create a bit pattern during the writing stage of operation. Fourier transform lens means 21 performs a Fourier transform of the bit pattern. Page composer 20 may be positioned such that second beam 11*s* passes through page composer 20 prior to or after second beam 11*s* passes through Fourier transform lens means 21**.

Beam intensity control means, which in the embodiment shown in FIG. 3*a* comprise individual modulators 23 and 24 in the first and second beams, cause the combined intensity of the first and second beams to be sufficient to store the bit pattern as a hologram during the writing stage. During the reading stage the intensity of light incident upon the hologram must be insufficient to alter the hologram. Although two modulators 23 and 24 are specifically shown in the figures, it is to be understood that in some embodiments of the present invention, a single modulator which is positioned between light source 10 and beam splitter 13 may comprise the beam intensity control means.

When memory medium 12 comprises a magnetic film, erase coil 22 positioned proximate memory medium 12 may be utilized to aid erasure of the holograms.

FIG. 3*b* shows the operation of the system of FIG. 3*a* during the reading stage of operation. During readout both first beam **11*r* and second beam 11*s* are directed to one of the holograms stored on memory medium 12. Therefore, during readout first beam 11*r* acts as the readout beam while second beam 11*s* acts as the polarization reference beam. Modulators 23 and 24** control the intensity of beams 11$r$ and 11$s$ such that the combined intensity is insufficient to alter the hologram during readout. During readout, all the light valves of page composer 20 are open.

Pivoting means in the form of pivoting lens 26, which may comprise a single lens or multiple lenses, is positioned proximate memory medium 12. The undiffracted portion of second beam 11$s$ and the diffracted portion of the first beam 11$r$ are superimposed and their wavefronts are well-matched after passing the memory medium plane. Pivoting lens 26 pivots the superimposed beams from each of the plurality of holograms into the first and second reconstructed image planes.

The pivoting lens 26 shown in FIG. 3 has a substantially flat surface 26$a$ and a curved surface 26$b$. Memory medium 12 is a deposited layer on the substantially flat surface 26$a$ of pivoting lens 26. Also, the memory medium can be deposited on the backside of lens 26 instead of the frontside as shown in FIG. 3, or pivoting lens 26 may be separate physically from memory medium 12.

Polarization beam splitter 34 is positioned in the path of the superimposed beams for directing that portion of the superimposed beam having a third polarization direction to the first reconstructed image plane and for directing that portion of the superimposed beams having the fourth polarization direction to the second reconstructed image plane. First and second detector arrays 25$a$ and 25$b$ are positioned at the first and second reconstructed image planes respectively. Each detector of the first array is positioned to receive light representing one bit of the bit pattern and to provide a first output signal indicative of the intensity of the light received. Similarly each detector of second array is positioned to receive light representing one bit of the bit pattern and to provide a first output signal indicative of the intensity of the light received. Signal comparing means 36 receives each of the first and second signals from the various detectors of the two arrays and produces an output signal for each of the bits of the bit pattern. The output signal is indicative of the difference of corresponding first and second signals.

Figure 4A:
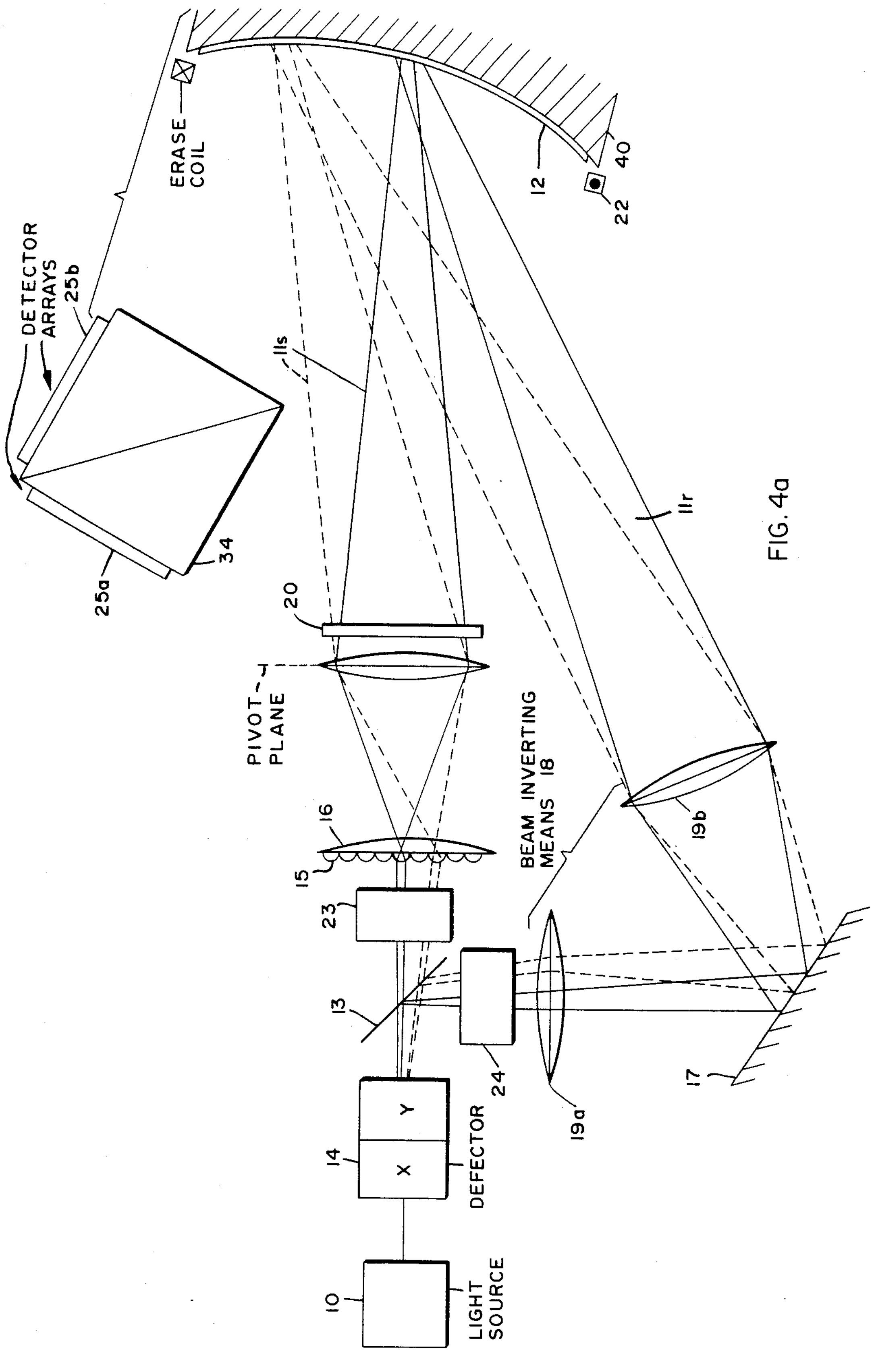
FIGS. 4*a* and 4*b* show another embodiment of the present invention in which a magnetic film is the memory medium and the Kerr effect readout from the magnetic film is utilized.
Figure 4B:
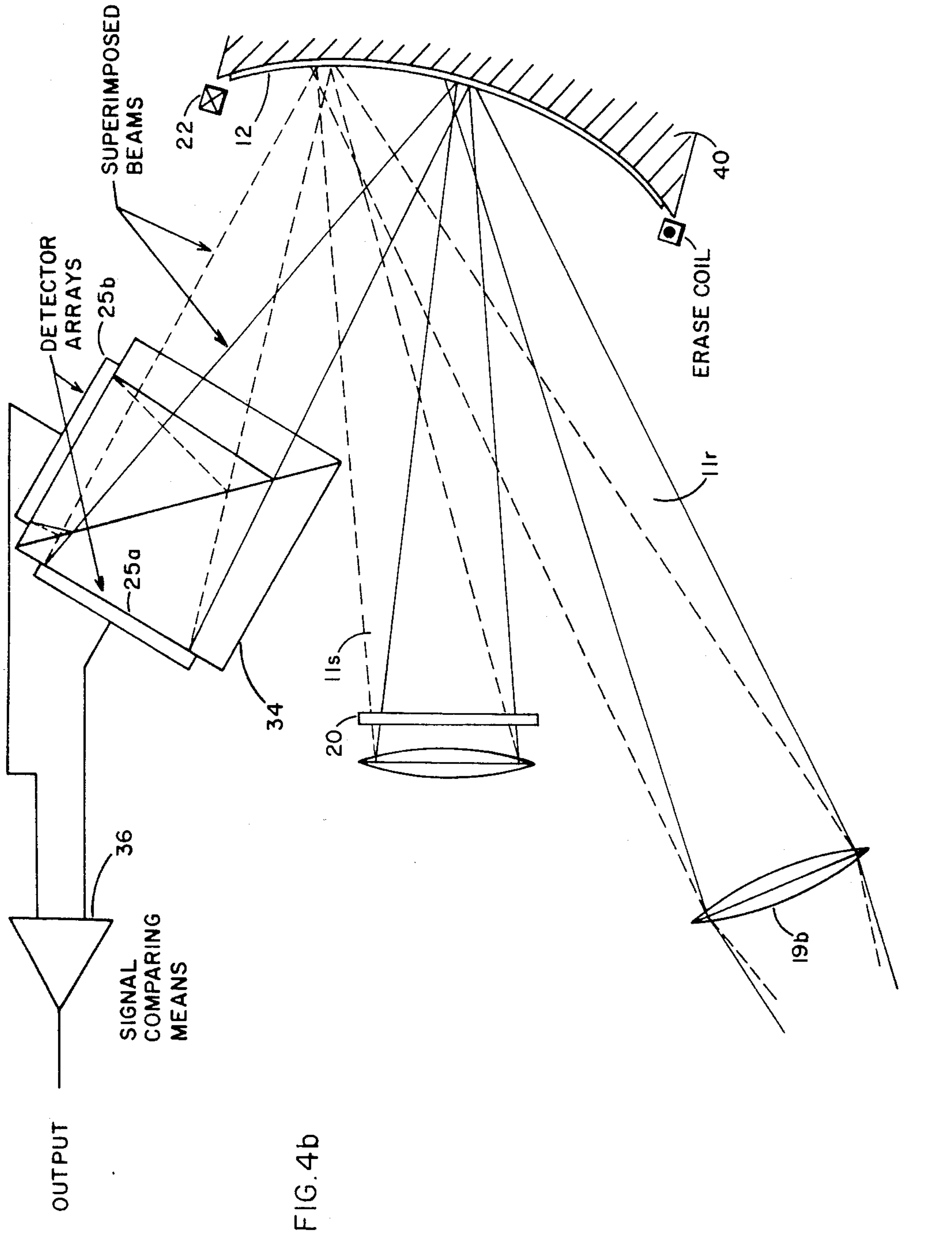

FIGS. 4$a$ and 4$b$ show another embodiment of the present invention in which a magnetic film is memory medium 12 and in which the magneto-optic Kerr effect readout from the magnetic film is utilized. In the Kerr effect the diffracted portion of the readout beam is reflected by the magnetic film whereas in a Faraday effect readout such as shown in FIG. 3$b$, the diffracted portion of the readout beam is transmitted through the magnetic film. In the Kerr effect readout, as in the Faraday effect readout, the magnetic film causes the diffracted portion of the first beam to have a polarization direction essentially orthogonal to the undiffracted portion of the second beam. The system of FIG. 4 is similar to that shown in FIG. 3 and similar numerals are used to designate similar elements. In the embodiment shown, the pivoting means comprises a parabolic mirror 40 rather than a lens such as pivoting lens 26 of FIG. 3. Memory medium 12 comprises a magnetic film such as MnBi which is deposited on the surface of parabolic mirror 40. It should be noted that beam inverting means 18 and mirror 17 are positioned in the path of first beam 11$r$, rather than in the path of second beam 11$s$ as shown in Figure 3.

During readout, FIG. 4$b$, both first beam 11$r$ and second beam 11s are again directed to memory medium 12, as described previously with reference to FIG. 3$b$. Parabolic mirror 40 pivots the undiffracted portion of second beam 11$s$ and the diffracted portion of first beam 11$r$. It should be noted that in FIG. 4, page composer 20 and first and second detector arrays 25$a$ and 25$b$ obey an object-image relationship with respect to parabolic mirror 40. It can be shown that when page composer 20 and first and second detector arrays 25$a$ and 25$b$ are positioned symmetrically with respect to the principal axis of parabolic mirror 40, and when the magnification is unity, the astigmatism and distortion of these elements is automatically eliminated.

To demonstrate the significant improvement in performance of the present invention, a comparison will be made of the performance of the system shown in FIGS. 3 and 4 when a single readout beam is utilized and when the differential detection of the present invention utilizing two beams is used.

In a readout system where "straight detection" with a single readout beam is used, the light intensity of each bit $p$ in the reconstructed bit pattern is governed by the diffraction efficiency $\eta$ of the memory medium and the number of bits per page $N^2$. That is, $$p = P_o \cdot \eta / N^2 \qquad \text{Eq. 1}$$

Using $\eta$ of $5 \times 10^{-5}$ for MnBi, $N^2$ of $5 \times 10^4$, the $p/P_o$ is equal to $10^{-9}$.

Assuming that the noise is comprised of thermal noise due to the load and shot noise due to the detector, the signal-to-noise ratio $S/N$ can be described by the relation $$S/N = \frac{\frac{1}{2} i_1^2 R_{eq}}{[2ei_1R_{eq}\Delta f + 2ei_dR_{eq}\Delta f + 4kT\Delta f]} \qquad \text{Eq. 2}$$

$$= \frac{\eta_Q p}{4(h\nu\Delta f)} \Big/ \left\{1 + \left(\frac{i_d}{i_1}\right) + \left(\frac{2kT}{ei_1R_{eq}}\right)\right\} \qquad \text{Eq. 3}$$

where $i_1 = (\eta_Q p) / (h\nu/e)$, Eq. 4

$i_d$ = dark current, $R_{eq}$ = equivalent load resistance, and $\eta_Q$ = quantum efficiency of the detector, $h$ = Planck's constant, $\nu$ = Optical frequency, $e$ = Electric change, $\Delta f$ = Detector bandwidth, $k$ = Boltzmann's constant, and $T$ = Absolute temperature.

The value of $S/N$ depends on the illumination level $p$, the dark noise of the detector $i_d$ and the load resistor which in turn is determined by the bandwidth required, $\Delta f$. To give an example, assume that PIN photodiodes are used, that the dark current is $10^{-9}$ amp per photodiode in an array, that $\eta_Q$ is equal to 0.5 so that $i_1$ equals about 0.3 na per nw of $p$, and that $R_{eq}$ = 10K ohms and $\Delta f$ = 1 MHz. The bandwidth $\Delta f$ depends upon whether the readout is parallel or partially parallel such as in word-organized readout. For a word-organized readout, a data rate of 10 MHz calls for a bandwidth of 1 MHz if 10 bits constitute one word. Using these numbers the noise becomes thermal-noise limited (the thermal-noise limit extends to $R_{eq}$ of about 1 megohm) so that the $S/N$ expression is simplified to $S/N = \frac{1}{8} (i_1^2 R_{eq} / kT\Delta f)$. Eq. 5

For $i_1$ of 1 na, $S/N$ is equal to 2.5. This calls for a reading optical power of 3 watts. If the reading power is increased to 10 watts, $S/N$ is increased to 20.

Turning now to the differential readout system of the present invention, and assuming that $I_A$ is the light intensity of a bit received by a detector of the first detector array $I_B$ is the light intensity of the same bit received by a detector of the second detector array, then $$I_A = |\vec{E}_A|^2 = |\vec{E}_{PR}{}^A + \vec{E}_S{}^A|^2$$
$$= \tfrac{1}{2}|\vec{E}_{PR}|^2 + \tfrac{1}{2}|\vec{E}_S|^2 + |\vec{E}_{PR}|\cdot|\vec{E}_S| , \quad \text{Eq. 6a}$$

and $$I_B = |\vec{E}_B|^2 = |\vec{E}_{LO}{}^B + \vec{E}_S{}^B|^2$$
$$= \tfrac{1}{2}|\vec{E}_{PR}|^2 + \tfrac{1}{2}|\vec{E}_S|^2 - |\vec{E}_{PR}|\cdot|\vec{E}_S| . \quad \text{Eq. 6b}$$

The differential power in each bit is then given by, $$I_A - I_B = 2|E_{PR}|\cdot|E_S|$$
$$= 2\sqrt{P_{PR}e^{-\delta t}P_S\cdot\eta_F/N^2} = \frac{2\sqrt{r}}{1+r}P_o\sqrt{\eta_F e^{-\delta t}/N^2} \quad \text{Eq. 7}$$

where $P_{PR}$ is polarization reference power, $P_s$ is the reading beam power in the reference channel and $r$ equals $P_s/P_{PR}$. Also $\alpha$ is the optical absorption constant, $t$ is the thickness of the memory medium, and $\eta_F$ is the Faraday diffraction efficiency. Comparing Equation 7 with Equation 1, the gain in the available power per bit is $$G_F = ((I_A - I_B)/p) = \frac{2\sqrt{r}}{1+r}\frac{e^{\delta t/2}}{\sqrt{\eta_F}} \quad \text{Eq. 8}$$

For example, in the Faraday effect readout system of FIG. 3 using MnBi, $e^{-\delta t/2} = 0.17$, $\sqrt{\eta_F} = (5 \times 10^{-5}) = 7 \times 10^{-3}$, and using $r = 1$, one gets $G_F = 24$.

If the Kerr effect system shown in FIG. 4 is used, then $$I_A - I_B = \frac{\sqrt{r}}{1+r}P_o\sqrt{\eta_K R}/N^2 \quad \text{Eq. 9}$$

and the gain is, $$G_K = \frac{2\sqrt{r}}{1+r}\sqrt{R/\eta_K} \quad \text{Eq. 10}$$

where $\eta_K$ is the Kerr diffraction efficiency and R is the reflectivity of the memory medium. Again, using $r = 1$, and $R = 0.3$ and $\eta_K = 2 \times 10^{-5}$, one gets $G_K = 120$. Therefore, the Kerr system is superior to the Faraday system when differential readout is employed.

Turning now to the determination of $S/N$ in the differential readout system, it can be shown that the noise sources includes shot noise due to the d.c. photocurrent $I_o$, the dark current $I_o'$, and thermal noise from the lossly elements in the photodetector and the equivalent input noise of the amplifier, all of which is lumped into an equivalent noise temperature $T_{eq}$. Thus, $$S/N = \frac{1}{2}i_1{}^2R_{eq}/[2eI_0R_{eq}\Delta f + 2eI_0'R_{eq}\Delta f + kT_{eq}\Delta f] \quad 11$$

There are two special cases of interest which provide insight into the performance of the differential readout system of the present invention; one is the thermal noise limited case and the other is the shot-noise limited case. In the thermal noise case Equation 10 becomes, $$S/N = \tfrac{1}{8}(i_1{}^2R \quad /kT\Delta f) \quad \text{Eq. 12}$$

where $$i_1 = 2\eta_q\sqrt{P_{PR}e^{-\alpha t}P_s\eta_F}/N^2(h\nu/e) \quad 13a$$

if the Faraday effect is used, or $$i_1 = 2\eta_q\sqrt{P_{PR}RP_s\eta_K}/N^2(h\nu/e) \quad 13b$$

if the Kerr effect is used.

As an example, assuming $P_{PR} = P_s = P_o/2$, assuming $\Delta f$ = MHz, $\eta_q = 0.5$, $h\nu = 2$ eV, $N^2 = 5 \times 10^5$, $R = 0.3$ and $\eta_K = 2 \times 10^{-5}$, then $i_1/P_o$ is $10^{-8}$ amp/w. Therefore, when $R_{eq} = 10^4$ ohms, $$(S/N)\cdot(1/_p2) = 30/(\text{watt})^2. \quad \text{Eq. 14}$$

If 1 watt is used for reading, $S/N$ is 30.

In the shot-noise limited cases $$I_o >> 2kT/eR_{eq}, \quad \text{Eq. 15}$$

where $I_o$ is related to the optical power by $$I_0 = \eta_q P_{PR}R/N^2\left(\frac{h\nu}{e}\right). \quad 16$$

The $S/N$ ratio becomes, $$S/N = \tfrac{1}{4}(i_1{}^2R_{eq}/eI_oR_{eq}\Delta f) = (\eta_q/h\nu\Delta f)(\eta_K P_s/N^2) \quad 17$$

It can be seen that in the shot-noise limited case, $S/N$ is linearly proportional to the optical power while the thermal noise limited case $S/N$ is proportional to the square of the optical reading power.

Again using the numbers $R_{eq}$ = 10K Ω and $T$ = 300°K, Equation 15 yields the value of $(2kT/eR_{eq}) = 5.2 \times 10^{-6}$ amp. This value of $I_o$ corresponds to $P_{PR}$ of 3 watts. The optical power has to be much greater than 3 watts in order to drive the photodiode to shot-noise limited performance. Assuming $P_{PR}$ = 15 watts and $P_s$ = 1 watt, $S/N$ becomes 625.

The foregoing analysis shows that a differential system, particularly one using the Kerr readout provides a significant improvement in $S/N$ over the straight detection method by about a factor of 30 in the examples given. In addition, the differential technique of the present invention provides the significant advantage of relative insensitivity to laser noise and fluctuations during readout.

While this invention has been disclosed with particular reference to the preferred embodiments, it will be understood by those skilled in the art that changes in form and detail may be made without departing from the spirit and scope of the invention.

The embodiments of the invention in which an exclusive property or right is claimed are defined as follows:

1. In a holographic optical memory having a memory medium upon which a plurality of holograms are stored, a system for reading out a bit pattern stored in one of the holograms, comprising:

light source means for providing a coherent light beam, beam splitter means for splitting the coherent beam into a first and second beam, light beam directing means for selectively directing the first beam to one of the plurality of holograms, a portion of the first beam being diffracted by the hologram to form at first and second reconstructed image planes reconstructed images of the bit pattern stored in the hologram, light beam superimposing means for superimposing the second beam with the diffracted portion of the first beam, polarization rotating means positioned in the path of one of the first and second beams for rotating the polarization of one of the beams such that the diffracted portion of the first beam has a first polarization direction, and the second beam has a second polarization direction essentially orthogonal to the first polarization direction, polarizing beam splitter means positioned in the path of the superimposed beams for directing that portion of the superimposed beams having a third polarization direction to the first reconstructed image plane and for directing that portion of the superimposed beams having a fourth polarization direction to the second reconstructed image plane, the third polarization direction being oriented essentially 45° from both the first and second polarization direction, and the fourth polarization direction being oriented essentially orthogonal to the third polarization direction, first array of detectors positioned at the first reconstructed image plane, each detector positioned to receive light representing one bit of the bit pattern and to provide a first signal indicative of the intensity of the light received, second array of detectors positioned at the second reconstructed image plane, each detector positioned to receive light representing one bit of the bit pattern and to provide a second signal indicative of the intensity of the light received, and signal comparing means for receiving each of the first and second signals, and for producing an output signal for each of the bits of the bit pattern, the output signal being indicative of the difference of corresponding first and second signals.

2. The invention as described in claim 1 wherein the memory medium and the polarization rotating means comprise a magnetic film.

3. The invention as described in claim 2 wherein the magnetic film is manganese bismuth.

4. A holographic optical memory comprising:

light source means for providing a coherent light beam, beam splitter means for splitting the coherent light beam into a first and a second beam, a memory medium for the storage of a plurality of holograms, beam directing means for simultaneously directing the first and second beams to coincide at a selected region of the memory medium, page composer means positioned in the path of the second beam between the beam splitter means and the memory medium for creating a bit pattern in the second beam during the writing stage, beam intensity control means for causing the combined intensity of the first and second beams to be sufficient to store the bit pattern as a hologram during the writing stage, and insufficient to alter the hologram during the reading stage, pivoting means positioned proximate the memory medium for pivoting, during the reading stage, superimposed beams comprising a diffracted portion of the first beam and an undiffracted portion of the second beam into first and second reconstructed image planes, polarization rotating means positioned in the path of one of the first and second beams for rotating the polarization direction of one of the beams during the reading stage such that the diffracted portion of the first beam has a first polarization direction, and the undiffracted portion of the second beam has a second polarization direction essentially orthogonal to the first polarization direction, polarizing beam splitter means positioned in the path of the superimposed beams for directing that portion of the superimposed beams having a third polarization direction to the first reconstructed image plane and for directing that portion of the superimposed beams having a fourth polarization direction to the second reconstructed image plane, the third polarization direction being oriented essentially 45° from both the first and the second polarization directions, and the fourth polarization direction being oriented essentially orthogonal to the third polarization direction, first array of detectors positioned at the first reconstructed image plane, each detector positioned to receive the light representing one bit of the reconstructed bit pattern formed by the diffracted portion of the first beam and to provide a first signal indicative of the intensity of the light received, second array of detectors positioned at the second reconstructed image plane, each detector positioned to receive the light representing one bit of the reconstructed bit pattern formed by the diffracted portion of the first beam and to provide a second signal indicative of the intensity of the light received, and signal comparing means for receiving each of the first and second signals and for producing an output signal for each of the bits of the bit pattern indicative of the difference of corresponding first and second signals.

5. The holographic optical memory of claim 4 wherein the beam directing means comprises:

light beam deflector means positioned between the light source means and the beam splitter means for deflecting the first and second beams to a plurality of resolvable spots, mirror means positioned in the path of one of the first and second beams for changing the direction of the propagation of the beam, beam inverting means positioned in the path of one of the first and second beams for inverting the angular direction of the beam, an array of individual lenses positioned in the path of the second beam, each lens being positioned at one of the plurality of resolvable spots, for reducing the beam diameter of the resolvable spots, and field lens means positioned in the path of the second beam between the array of individual lenses and the page composer means for pivoting the second beam at a first pivot plane.

6. The holographic optical memory of claim 5 wherein beam inverting means comprises first and second lenses.

7. The holographic optical memory of claim 5 wherein the beam inverting means is positioned in the path of the second beam.

8. The holographic optical memory of claim 7 wherein the beam inverting means is positioned essentially at the first pivot plane and wherein the beam inverting means further pivots the second beam at a second pivot plane.

9. The holographic optical memory of claim 8 wherein the page composer means is positioned proximate the second pivot plane.

10. The holographic optical memory of claim 5 wherein the page composer means is positioned essentially at the first pivot plane.

11. The holographic optical memory of claim 4 and further comprising Fourier transform lens means positioned in the path of the second beam proximate the page composer means for performing a Fourier transform of the bit pattern produced by the page composer means.

12. The holographic optical memory of claim 4 and wherein the pivoting means comprises pivoting lens means.

13. The holographic optical memory of claim 12 wherein the pivoting lens means comprises a lens having a substantially flat surface and a curved surface.

14. The holographic optical memory of claim 13 wherein the memory medium comprises a deposited layer on the substantially flat surface.

15. The holographic optical memory of claim 4 wherein the memory medium and the polarization rotating means comprise a magnetic film.

16. The holographic optical memory of claim 15 wherein the diffracted portion of the first beam and the undiffracted portion of the second beam are transmitted through the magnetic film.

17. The holographic optical memory of claim 15 wherein the diffracted portion of the first beam and the undiffracted portion of the second beam are reflected from the magnetic film.

18. The holographic optical memory of claim 15 wherein the magnetic film is manganese bismuth.

* * * * *